United States Patent

[11] 3,540,744

| [72] | Inventor | Hsin Sheng Chen<br>Hamden, Connecticut 0 |
|------|----------|------------------------------------------|
| [21] | Appl. No. | 843,165 |
| [22] | Filed | July 18, 1969<br>Continuation-in-part of application Ser. No.<br>631,731, April 18, 1967, now abandoned. |
| [45] | Patented | Nov. 17, 1970 |
| [73] | Assignee | Ingersoll-Rand Company<br>New York, New York<br>a corporation of New Jersey |

[54] SEAL
10 Claims, 4 Drawing Figs.

[52] U.S. Cl...................................................... 277/99,
277/169, 91/392
[51] Int. Cl....................................................... F16j 15/00

[50] Field of Search.......................................... 277/97-
—100, 85—87, 168—169; 91/392

References Cited
UNITED STATES PATENTS 2,060,209  11/1936  Heckert.................. 277/99X Primary Examiner—Laverne D. Geiger
Assistant Examiner—Jeffrey S. Mednick
Attorneys—Carl R. Horten, David W. Tibbott and Frank H.
  Thomson ABSTRACT: A seal for use in high pressure applications. It includes a central section which is substantially cylindrical and end portions which are convex or hemispherical. The seal is to be used for providing a seal at two spaced apart locations. The seal may be used in a high energy rate actuator.

Patented Nov. 17, 1970 3,540,744

INVENTOR
HSIN SHENG CHEN
BY
Frank H. Thomson
ATTORNEY

SEAL

BACKGROUND OF THE INVENTION

This application is a continuation-in-part of my earlier copending U.S. Pat. application entitled "Seal", filed Apr. 18, 1967 having Ser. No. 631,731 now abandoned. This invention relates to apparatus for forming a seal at two spaced apart locations. This invention has particular application where the two locations at which a seal is to be formed may be nonaligned.

In one sense this invention is an improvement upon my prior U.S. Pat. No. 3,431,725. In another sense this invention provides a sealing element which may be used wherever a seal is to be formed at two spaced apart locations.

Some prior sealing devices which are designed to form a seal at two spaced apart locations have the disadvantage that they are unable to withstand extremely high pressure. If a resilient sealing element is used, the high pressures involved can collapse the resilient material. Spherical sealing devices and other high pressure seals are known but they have the disadvantage that if the two locations at which a seal is to be formed are not accurately aligned, a complete seal is not formed.

SUMMARY

It is therefore the principal object of this invention to provide a novel sealing device for use in high pressure applications.

It is another object of this invention to provide a sealing device for forming a seal at two spaced apart locations which may be nonaligned.

In general, the foregoing objects will be carried out by providing apparatus for forming a seal at two spaced apart locations which includes a pair of convex surfaces each having a center of curvature. One of the convex surfaces is adapted to sealingly contact one of the locations and the other of the convex surfaces is adapted to sealingly contact the other location. There is an elongated body rigidly connecting the two convex surfaces to each other so that said convex surfaces and said elongated body form an integral unit. The center of curvature of one of the convex surfaces is spaced from the center of curvature of the other of the convex surfaces.

BRIEF DESCRIPTION OF THE DRAWING

The foregoing and other objects will become apparent from the following description and drawings wherein.

DESCRIPTION OF THE PREFERRED EMBODIMENT

Figures 2, 3:
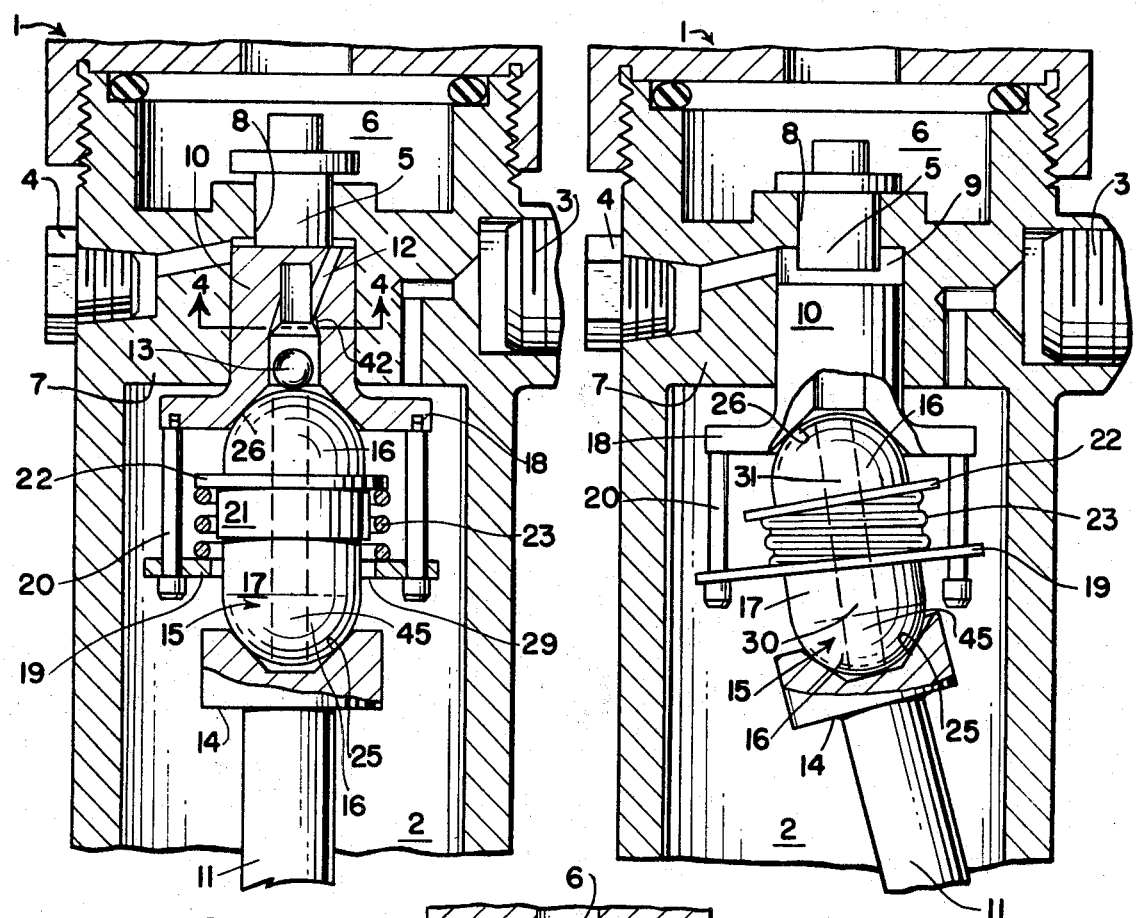
FIG. 2 is an enlarged detail of a portion of FIG. 1 showing the sealing means of this invention in sealing position.
FIG. 3 is a view similar to FIG. 2 showing one of the locations at which a seal is formed being nonaligned with the other location at which a seal is formed.

Referring to the drawings, a high energy rate actuator is generally indicated at 1. This is essentially the same as is shown in my aforementioned U.S. Pat. No. 3,431,725 with the differences relating to the seal of the present invention. The high energy rate actuator 1 includes a casing which provides a first chamber 2 closed by a cap 32. The chamber 2 is substantially filled with liquid. Liquid is supplied to chamber 2 through a supply line 3 which is connected to a pressurizing means (not shown) such as a conventional pump. A wall 7 is provided at the rear end of the chamber 2 to provide a second or spring chamber 6. A bore 8, counterbored at 9, is provided in the wall 7 connecting the chamber 2 and 6. A spring piston 5 is mounted for reciprocal movement in bore 8 and a triggering means 10 is slidably mounted in the counterbore 9. The triggering means 10 has a passage 12 leading to an outlet line 4. A ball 13 rests against a seat 41 to thereby permit limited flow through passages 42 to passage 12. The seal of this invention, as applied to high energy rate actuators, is used to form a seal at the triggering means 10 and at the ram 11. The formation of a seal is essential to the operation of the actuator, as will become apparent hereinafter.

The seal of this invention is generally indicated at 15 and includes a pair of convex surfaces 16. Although I have shown these as hemispheres, it is not intended that this be a limiting factor. If desired, they could be any chordal segment of a sphere or a complete sphere. I have provided a central portion 17 which, in this case, is cylindrical connecting the two convex surfaces. If desired, however, it could be any shape and might simply be a rod connecting the two surfaces or the convex surfaces 16 and connecting portion 17 could be made as a single integral unit. A passage 45 extends longitudinally through the seal 15 for a purpose which will become apparent. The passage 45 is preferably smaller in diameter than the diameter of ball 13.

I have provided an extension or flange 18 on the triggering means 10 in order to fix the sealing means to the actuator so that it will be in proper position for the operation of the high energy rate actuator. A platform 19 is provided and connected to the flange 18 by suitable means such as bolts 20. The platform 19 has an opening 29 sufficiently large to allow the seal 15 to easily slide through. A sleeve 21 having a flange 22 which provides a shoulder is fitted to the connecting body 17. A spring 23 is provided between the platform 19 and the flange 22. This spring serves two functions. The first function being to bias the seal towards the triggering means. The second function is to allow nonalignment of the ram 11 or permit the seal to "wobble" as the nonalignment or angularity between the ram and triggering means varies.

Figures 1, 4:
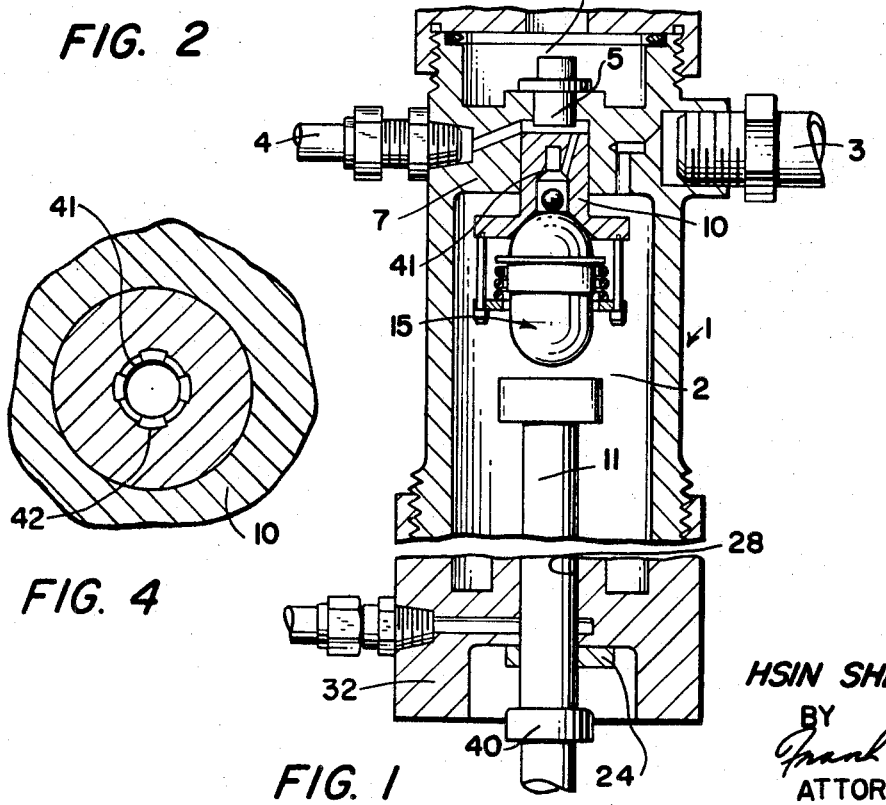
FIG. 1 is a sectional view showing the sealing means of this invention in non-sealing position as used in a high energy rate actuator.
FIG. 4 is a sectional view taken on the line 4-4 of FIG. 2.

As is more fully explained in the aforementioned prior patent, the high energy rate actuator operates as follows. The chamber 6 is pressurized to a predetermined amount by some suitable means. This pressure is applied to the spring piston 5. The ram 11 is then moved by some means to contact the seal 15 and form a seal around the conical area 25 of the ram 11. Pressure is then applied to the chamber 2 and acts on surface 14 of the ram 11. The ram 11, seal 15, and triggering means 10 move towards the spring piston 5. Pressure is continued to be applied in the chamber 2 to overcome the force in chamber 6 acting on spring piston 5. After the ram, triggering means, and spring piston 5 move a predetermined amount, the movement of the ram 11 rearwardly is stopped by flange 40 on the ram engaging a stop 24. The increasing pressure in chamber 2 causes the triggering means 10 to continue to move backward, breaking the seal formed between the sealing means 15 and the cone 25 of the ram. Fluid under pressure will then act on the conical area 25. Since the cone 25 has a greater surface area than the surface area 14, the ram is driven forward at a high rate of speed to deliver an impact to a workpiece or perform some other high speed operation. In order for a high energy rate actuator of this type to operate, a seal must be formed around the conical area 25. With this invention, a seal is insured even though the ram 11 may be warped or misaligned or both with respect to the triggering means 10. After firing, the pressure in chamber 2 is relieved through passage 45 in the seal 15, through passages 42 and passage 12 to outlet 4. This permits the triggering means 10 to return to the position of FIG. 1. The use of a limited flow valve 13 insures that after the seal between ram 11 and seal 15 is broken all the pressure in chamber 2 is not lost through outlet 4.

As is apparent from FIG. 3, this seal is designed to be effective if the ram is misaligned. Manufacturing tolerances often prevent the exact alignment of the triggering means 10 and the ram 11. One way in which nonalignment can occur is readily apparent from FIG. 3. The ram 11 will not be parallel with the axis of the triggering means 10 due to improper drilling of the bore 28 in the cap 29 or due to warping of the ram 11. A second way misalignment can occur is if the axis of the ram 11 and the axis of the triggering means 10 are parallel but offset from each other. This may be due to improper positioning of the bore 28. These two nonaligning positions may combine to provide nonparallel and offset axes. A simple ball seal will, to some extent, overcome the first nonaligned position; i.e., nonparallel axes. However, a simple ball will not overcome offset axes alone or offset and nonparallel axes. With the present invention, if the ram 11 is misaligned, as it contacts the seal 15, the seal 15 will swing or pivot about the conical surface 26 of the triggering means 10 until the center point 30 is aligned with the longitudinal axis of the ram 11. As the ram 11 continues to move while the chamber 2 is pressurized, any change in position of the ram 11 with respect to the triggering means 10 will not effect the seal formed at the ram 11 or at the triggering means 10. This is because the spring 23 and the shape of the seal 15 allows the seal 15 to "wobble" or change positions to maintain the relation between the point 30 and the axis of the ram 11. When the seal at the ram 11 is broken during the working stroke, the spring 23 returns the seal 15 to the position shown in FIG. 1 so that the seal 15 is in position for the next time the seal at the ram is to be formed, regardless of whether the ram 11 approaches the seal 15 at the same angle or position as before or a different angle or position.

The length of the connection portion 17 is important. A certain length connection 17 will take care of a certain range offset. By saying that a certain length connecting portion 17 will take care of a certain range offset, I mean that a particular length connecting portion 17 will take care of an offset up to a certain maximum. If the offset is less than the maximum, a seal will still be formed. If the offset is more than this, the length of the connecting portion must be increased. The length of the connecting portion 17 must be such that when a seal is formed between the ram 11 and the surface 16, the seal 15 may move so that the longitudinal axis of the ram 11 intersects the center point 30 of the adjacent convex surface. The increased length of the seal 15 allows a greater misalignment between the ram and triggering means. The center point 31 should always be intersected by the axis of the triggering means 10.

Although I have shown this seal for use in a high energy rate actuator, it is not intended that the invention be limited thereby. The seal of this invention may be used with a conduit adapted to carry fluid, the conduit to be sealed at various times. Although this description has been limited to the use of this seal for periodic sealing, this invention may be used where a permanent seal is to be formed.

I claim:

1. Apparatus for forming a seal at two spaced apart locations comprising:
 a pair of substantially convex surfaces each having a center of curvature;
 one of said convex surfaces being adapted to sealingly contact one of the location and the other of said convex surfaces being adapted to sealingly contact the other location;
 an elongated body rigidly connecting said convex surfaces to each other; and
 the center of curvature of one of said convex surfaces being spaced from the center of curvature of the other of said convex surfaces.

2. The apparatus of claim 1 wherein said locations are relatively movable, spaced apart elements, and further includes means for mounting the apparatus on one of said elements, said elongated body being sufficiently long to insure that the centers of curvature of the convex surfaces are spaced from each other.

3. The apparatus of claim 2 including means for biasing said apparatus towards the element on which it is mounted.

4. The apparatus of claim 3 wherein said convex surfaces are aligned on the longitudinal axis of the elongated body and the locations at which the seals are formed are substantially conical.

5. The apparatus of claim 4 wherein the center of curvature of each convex surface is aligned with the longitudinal axis of the adjacent element when the seal is formed.

6. For use in combination with a high energy rate actuator having a fluid filled chamber, a ram movably mounted within and extending out of said chamber, triggering means extending into said chamber and means for pressurizing the fluid in said chamber, means for forming a seal at said triggering means and said ram comprising:
 a pair of substantially convex surfaces;
 one of said surfaces adapted to sealingly contact said triggering means and the other of said surfaces adapted to selectively sealingly contact said ram; and
 an elongated body connecting said convex surfaces to each other.

7. The combination of claim 6 wherein said convex surfaces each have a center of curvature and the center of curvature of one convex surface is spaced from the center of curvature of the other convex surface, and said elongated body rigidly connects said convex surfaces.

8. The combination of claim 7 wherein said means for forming a seal is provided with a bore longitudinally therethrough.

9. The combination of claim 8 wherein said seal forming means is mounted on said triggering means and includes means for biasing said seal forming means into engagement with said triggering means.

10. The combination of claim 9 wherein the center of curvature of the convex surface which forms a seal with said triggering means is aligned with the longitudinal axis of said triggering means and the center of curvature of the convex surface which forms a seal with said ram is aligned with the longitudinal axis of said ram when the seal at said ram is formed.